United States Patent [19]

Peterson et al.

[11] Patent Number: 5,819,245

[45] Date of Patent: Oct. 6, 1998

[54] METHOD OF ORGANIZING DATA INTO A GRAPHICALLY ORIENTED FORMAT

[75] Inventors: William M. Peterson; Robert H. Leivian, both of Chandler, Ariz.

[73] Assignee: Motorola, Inc., Schaumburg, Ill.

[21] Appl. No.: 523,326

[22] Filed: Sep. 5, 1995

[51] Int. Cl.$^6$ .................................................. G06F 15/18
[52] U.S. Cl. ............................................................. 706/16
[58] Field of Search ................................. 395/22, 24, 23, 395/26, 604, 2.41, 600, 161; 365/49; 364/513, 550; 382/159; 706/16, 20

[56] References Cited

U.S. PATENT DOCUMENTS

| | | | |
|---|---|---|---|
| 4,718,025 | 1/1988 | Minor et al. | 364/550 |
| 5,014,219 | 5/1991 | White | 364/513 |
| 5,023,833 | 6/1991 | Baum et al. | 365/49 |
| 5,065,040 | 11/1991 | Peterson et al. | 307/201 |
| 5,067,095 | 11/1991 | Pererson et al. | 706/26 |
| 5,224,203 | 6/1993 | Skeirik | 395/22 |
| 5,434,966 | 7/1995 | Nakazawa et al. | 395/161 |
| 5,461,696 | 10/1995 | Frank et al. | 395/2.41 |
| 5,490,223 | 2/1996 | Nishimura et al. | 382/159 |
| 5,504,884 | 4/1996 | Kyuma et al. | 395/600 |
| 5,598,510 | 1/1997 | Castelaz | 395/23 |
| 5,608,899 | 3/1997 | Li et al. | 395/604 |
| 5,615,305 | 3/1997 | Bigus | 395/26 |
| 5,619,619 | 4/1997 | Shinohura et al. | 395/24 |
| 5,632,006 | 5/1997 | Peterson et al. | 706/26 |

OTHER PUBLICATIONS

Samuel Kaski and Teuvo Kohonen, "A Taxonomy of Poverty Types of Countries on a Self–Organizing Map", Helsinki University of Technology, 1994. pp. 1–15.

V–kovacs et al., A generalization technique for Nearest–Neighbor classifiers, Neural networks, 1991 IEEE International conference, 1991.

Chandrasekaran et al., An extended self–organizing map with gated neurons, 1993 IEEE conference on neural networks, pp. 1474–1479, Apr. 1, 1993.

Maekawa et al., A competitive system with adaptive gain tuning, 1994 IEEE International conference on neural networks, pp. 2813–2818, Jul. 2, 1994.

Rickman et al., Coding facial images for database retrieval using a self organizing neural network, IEE colloq. (1992) No. 017.

Gersho et al., Information retrieval using hybrid multi–layer neural networks, 1990 IEEE International conference on neural networks, pp. 111–117.

Baraldi et al., A self–organizing neural network to categorize a random input sequence of multivalued vectors, IGARSS 95, pp. 1258–1262. vol. 2. Jul, 14, 1995.

Choi et al., A high–precision VLSI winner–take–all circuit for self–organizing neural networks, IEEE Journal of solid states circuits, vol. 28, pp. 576–584, May 1993.

Baruah et al., Kohonen's feature maps applied to ordered clustering applications, 1991 IEEE International conference on neural networks, pp. 596–601, 1991.

Baraldi et al., A neural network for unsupervised categorization of multivalued Input Patterns: An application to satellite image clustering, IEEE transactions on geoscience and remote sensing, pp. 305–316, Mar. 1995.

*Primary Examiner*—Allen R. MacDonald
*Assistant Examiner*—Sanjin Shah
*Attorney, Agent, or Firm*—Robert D. Atkins

[57] ABSTRACT

A neural network (10) organizes the data items into a graphically oriented format by retrieving data items from a database (68) where each data item has a plurality of attributes. The neural network is organized (102) such that data items having similar attributes are assigned to neurons located closer together. The neurons of the neural network are matched (104) with the data items from the database and stored in a cross reference table. The cross reference table is displayed (106) on a computer screen (108) in a graphical format so that user visually relates the food items and sees the similarities and differences in their attribute data by the proximity of the data items to one another. The graphic format allows easy visual interpretation of the data items. For large databases, multiple neural networks (110, 112) can be organized hierarchically.

26 Claims, 5 Drawing Sheets

METHOD OF ORGANIZING DATA INTO A GRAPHICALLY ORIENTED FORMAT

BACKGROUND OF THE INVENTION

The present invention relates in general to the organization and graphical presentation of data and, more particularly, to a neural network that organizes data into a graphically oriented format.

People often complain of having too much information. At almost every turn, it seems as though there are more choices than anyone can reasonably assimilate in order to make a logical selection. For example, when one shops for groceries with the intent of buying healthy food, one faces a supermarket filled with items claiming to be nutritious. One must carefully check and compare the facts on calories, preservatives, fat, vitamins, etc. printed on the label of each and every food item to make informed choices. In another example, if one visits a video rental store, or a music store, making a selection with the vast number of titles, entertainers, ratings, themes, styles, etc. is often difficult. Still further examples where large amounts of data are typically present include investment market analysis, test analysis for integrated circuits (IC), library catalogs, and personal computer files.

In personal computer example, a favorite pastime for computer buffs is to "surf the internet." The internet is a vast collection of databases stored on remote computers and available over a conventional modem link. The database interfaces to the internet are generally primitive command line formats that require the user to enter cryptic instructions to move from one hierarchical level to another. These conventional databases are generally organized by key words and names. Unfortunately, it is difficult to find specific data by key words without knowing all of the possible choices of key words. That is, the user may not guess the right key words in the search command in order to find the desired data. Alternately, specific key words can relate to vastly different subject matter. For instance, a search on key word "stock" can return data on financial markets, soup ingredients, firearm components, and cattle. Even picking the right key word returns more information than desired. Few, if any, databases allow the user to search for an item that is similar to something else, e.g. it is difficult to search the internet for films similar to a specific title based only on title or other key words. Thus, it can be difficult to find information such as a particular topic, file, program, photograph, or recording on the internet system, or any other database, especially where the exact identity or attributes of the desired item are uncertain.

In the prior art, attempts have been made to organize and categorize data. For example, computer programs sort the data from particular fields into one or more levels. However, conventional sorting techniques generate a list, i.e. a one dimensional representation, which does not provide information as how the items in the list interrelate, or how similar or different each item is to one another. Moreover, sorted lists are difficult to use in order to observe clusters, groups, patterns, or trends.

Hence, a need exists to more effectively display data items from a database in a graphically oriented format that is easy to understand and interpret.

DETAILED DESCRIPTION OF THE PREFERRED EMBODIMENT

Figure 1:
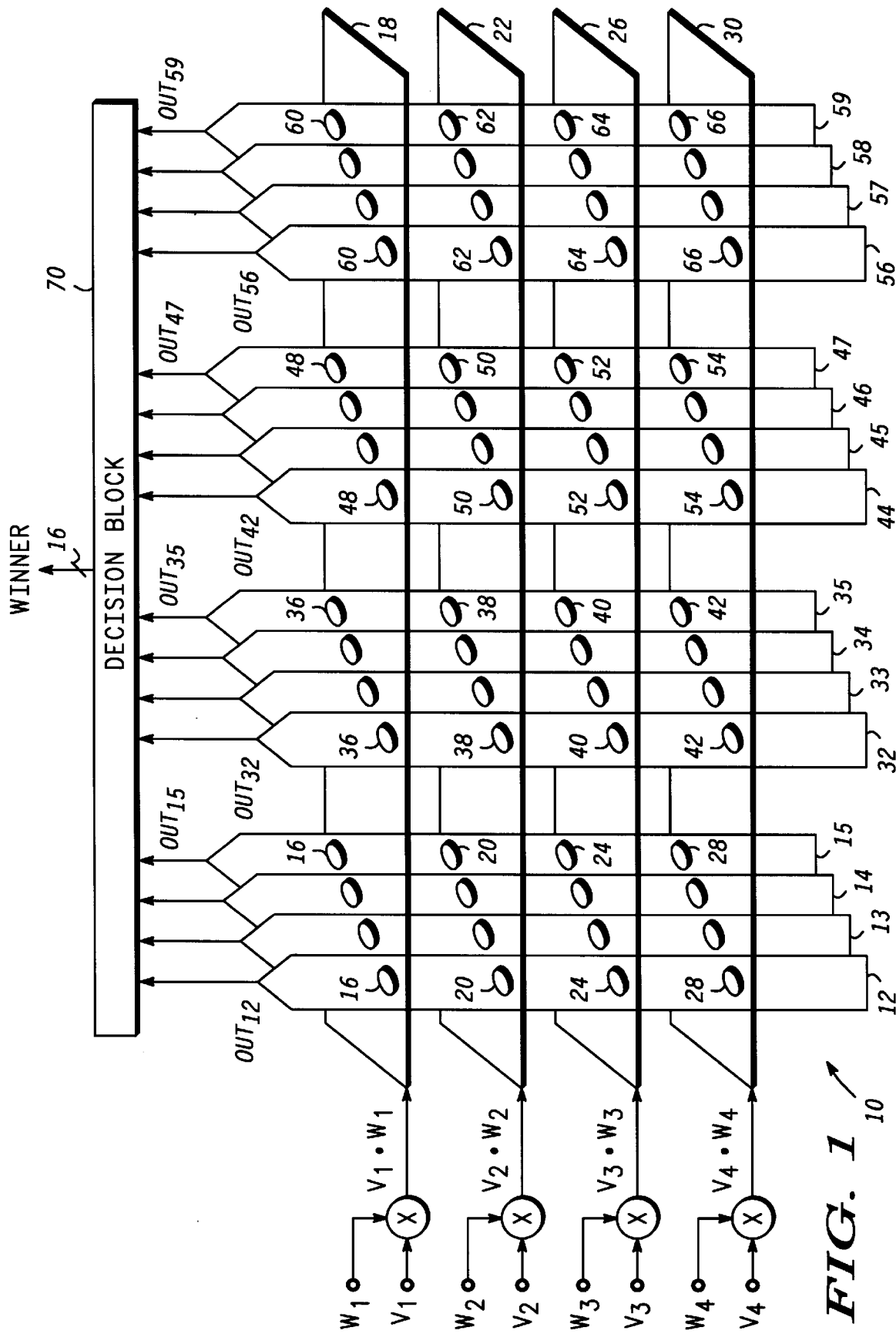
FIG. 1 is a block diagram illustrating a neural network receiving an input signal vector.

Referring to FIG. 1, neural network 10 is shown as a simplified, 2-dimensional organized feature map including neurons 12, 13, 14, and 15. A data item with predefined attributes is retrieved from a database (not shown). The database can be any source of data. The data item is converted to an input signal vector $V_{IN}$ comprising elements $V_1$, $V_2$, $V_3$, and $V_4$. Elements $V_1$, $V_2$, $V_3$, and $V_4$ are multiplied by weights $W_1$, $W_2$, $W_3$, and $W_4$, respectively, before application to neural network 10. The weights $W_1$–$W_4$ represent the relative importance of each element of the input signal vector $V_{IN}$. Neurons 12–15 each have a first synapse 16 disposed in conductive plane 18 that in turn receives input signal $V_1 \cdot W_1$. Conductive plane 18 is, for example, a sheet of negligible resistance that evenly distributes the input signal to each synapse. Neurons 12–15 also each have a second synapse 20 disposed in conductive plane 22 that in turn receives input signal $V_2 \cdot W_2$, a third synapse 24 disposed in conductive plane 26 that in turn receives input signal $V_3 \cdot W_3$, and a fourth synapse 28 disposed in conductive plane 30 that in turn receives input signal $V_4 \cdot W_4$.

Neural network 10 further includes neurons 32, 33, 34, and 35 each coupled for receiving signals $V_1 \cdot W_1$, $V_2 \cdot W_2$, $V_3 \cdot W_3$, and $V_4 \cdot W_4$ by way of conductive planes 18, 22, 26, and 30. Neurons 32–35 each have a first synapse 36 disposed in conductive plane 18, a second synapse 38 disposed in conductive plane 22, a third synapse 40 disposed in conductive plane 26, and a fourth synapse 42 disposed in conductive plane 30. Neurons 44, 45, 46, and 47 are each coupled for receiving signals $V_1 \cdot W_1$, $V_2 \cdot W_2$, $V_3 \cdot W_3$, and $V_4 \cdot W_4$ by way of conductive planes 18, 22, 26, and 30. Neurons 44–47 each have a first synapse 48 disposed in conductive plane 18, a second synapse 50 disposed in conductive plane 22, a third synapse 52 disposed in conductive plane 26, and a fourth synapse 54 disposed in conductive plane 30. Neurons 56, 57, 58, and 59 are each coupled for receiving signals $V_1 \cdot W_1 V_2 \cdot W_2$, $V_3 \cdot W_3$, and $V_4 \cdot W_4$ by way of conductive planes 18, 22, 26, and 30. Neurons 56–59 each have a first synapse 60 disposed in conductive plane 18, a second synapse 62 disposed in conductive plane 22, a third synapse 64 disposed in conductive plane 26, and a fourth synapse 66 disposed in conductive plane 30.

Conductive plane 18 evenly distributes the input signal $V_1 \cdot W_1$ to synapses 16, 36, 48, and 60, which in turn operate as variable conductance elements within the conductive plane. The variable conductance allows the synapses to adapt to the input signal vector during the training process described below. Likewise, conductive plane 22 distributes the input signal $V_2 \cdot W_2$ to synapses 20, 38, 50, and 62. Conductive plane 26 distributes the input signal $V_3 \cdot W_3$ to synapses 24, 40, 52, and 64, while conductive plane 30 distributes the input signal $V_4 \cdot W_4$ to synapses 28, 42, 54, and 66.

A detailed explanation of a single neuron processing element, e.g. neuron 12, is provided in U.S. Pat. No. 5,067,095, entitled "SPANN: Sequence Processing Artificial Neural Network" and is hereby incorporated by reference.

Briefly, each element of the input signal vector is multiplied by the corresponding weighting elements, e.g. synapses, of the respective neuron and summed and processed in the forward direction through a predetermined sigmoid function for providing the output signal of the neuron. The synapses 16, 20, 24, 28, 36, 38, 40, 42, 48, 50, 52, 54, 60, 62, 64, and 66 are set to random conductance values initially. The synapses then adapt, i.e. change in value, during a training phase based on a predetermined training rule. Another embodiment of the neurons involving a sum of differences approach is discussed in U.S. Pat. No. 5,097,141, entitled "Simple Distance Neuron" which is also incorporated by reference.

Assume that a database is provided with attributes for a number of data items. A simple food database is used to aid in understanding the present invention. Other databases including marketing data, technology data, consumer information, computer files, and government records are considered within the scope of the invention. The food database includes nutritional information such as calories, protein, carbohydrates, fiber, etc. on a variety of food items. One food item is an apple with specific values for its nutritional attribute data. Another item in the food database is a banana with values for its nutritional attribute data. In a different example, the database includes items of investment stocks with detailed attribute data on sales, debt ratio, price-to-earnings ratio, outstanding shares, etc. for each stock. In yet another example, the database includes items of video rentals with detailed attribute data on subject matter, theme, actors/directors, ratings, etc. for each rental. In a more technical application, the database includes IC testing data with detailed information on test categories, test measurements, failure rates, etc. In a computer files example, the data items are files and the attribute data is type of file, hierarchy, owner, size, etc. Thus, the database contains a potentially large number of items with a potentially large number of detailed attributes or statistics on each item. Initializing and loading such a database is well known in the art.

The present invention is implemented by computer software operating on a computer system such as a personal workstation. The computer system with its processor, memory and coding provide the means of performing the steps of FIG. 2. In one embodiment, the invention is completely encoded in software. Alternately, a hardware implementation such as neural network 10, a Sammon map, or any other linear and non-linear mapping system that projects data from N-dimensional space to 2-dimensional space is used in conjunction with the software to accelerate the computational processing.

Neural network 10 is one such projection map that is first trained to the present database. In the food database example, each food item is systematically retrieved from the database, converted to an input signal vector, and applied to neural network 10 for training, see step 68 of FIG. 2. For example, the attribute data for an apple is retrieved and applied as elements of input signal vector $V_{IN}$ to neural network 10. Weights $W_1$, $W_2$, $W_3$, and $W_4$ are set to value one, i.e. all equally important. For the purpose of the present explanation, assume input signal $V_1$ is a 20.0 millivolts (mv) signal representing that the apple is in the 20th percentile of calories for all food items in the database, i.e. 20% of food items have fewer calories and 80% of the food items have more calories. Input signal $V_2$ is a 1.0 mv signal representing 1st percentile of protein for all food items in the database. Input signal $V_3$ is a 42.0 mv signal representing 42nd percentile of carbohydrates, and input signal $V_4$ is a 30.0 mv signal representing 30th percentile of fiber for all food items in the database.

The output signal of neuron 12 is given as $OUT_{12}$ =SIGMOID($V_1 \cdot S_{16} \cdot V_2 \cdot S_{20} + V_3 \cdot S_{24} + V_4 \cdot S_{28}$), where SIGMOID() is a sigmoid function such as a linear or exponential ramp and $W_1$, $W_2$, $W_3$, and $W_4$=1.0. Values $S_{16}$, $S_{20}$, $S_{24}$, and $S_{28}$ represent synapses 16, 20, 24, and 28 of neuron 12, respectively. Neurons 13–15 also operate as processing elements to provide similar output signals $OUT_{13}$, $OUT_{14}$, and $OUT_{15}$ according to their respective synapses. The output signal of neuron 32 is given as $OUT_{32}$ =SIGMOID ($V_1 \cdot S_{36} + V_2 \cdot S_{38} + V_3 \cdot S_{40} + V_4 \cdot S_{42}$), where $S_{36}$, $S_{38}$, $S_{40}$, and $S_{42}$ are the values of synapses 36, 38, 40, and 42 of neuron 32, respectively. Neurons 33–35 also operate as processing elements to provide similar output signals $OUT_{33}$, $OUT_{34}$, and $OUT_{35}$ according to their respective synapses. The output signal of neuron 44 is given as $OUT_{44}$ =SIGMOID ($V_1 \cdot S_{48} + V_2 \cdot S_{50} + V_3 \cdot S_{52} + V_4 \cdot S_{54}$), where $S_{48}$, $S_{50}$, $S_{52}$, and $S_{54}$ are the values of synapses 48, 50, 52, and 54 of neuron 44, respectively. Neurons 45–47 also operate as processing elements to provide similar output signals $OUT_{45}$, $OUT_{46}$, and $OUT_{47}$ according to their respective synapses. The output signal of neuron 56 is given as $OUT_{56}$ =SIGMOID ($V_1 \cdot S_{60} + V_2 \cdot S_{62} + V_3 \cdot S_{64} + V_4 \cdot S_{66}$), where $S_{60}$, $S_{62}$, $S_{64}$, and $S_{66}$ are the values of synapses 60, 62, 64, and 66 of neuron 56, respectively. Neurons 57–59 also operate as processing elements to provide similar output signals $OUT_{57}$, $OUT_{58}$, and $OUT_{59}$ according to their respective synapses.

The output signals $OUT_{12}$–$OUT_{15}$, $OUT_{32}$–$OUT_{35}$, $OUT_{44}$–$OUT_{47}$, and $OUT_{56}$–$OUT_{59}$ are applied to decision block 70 that determines the winning neuron, i.e. the one having the highest, or lowest for a simple distance neuron, magnitude output signal representing the closest match to the input signal vector. The other neurons having synapses with a lower degree of correlation to a particular input signal vector have a lower output activity level. Decision block 70 provides sixteen outputs labeled as WINNER, one corresponding to each neuron. One of the sixteen outputs has a different state, e.g. a high state, as compared to the other fifteen outputs having a low state. The one different output corresponds to the winning neuron.

Figure 3:
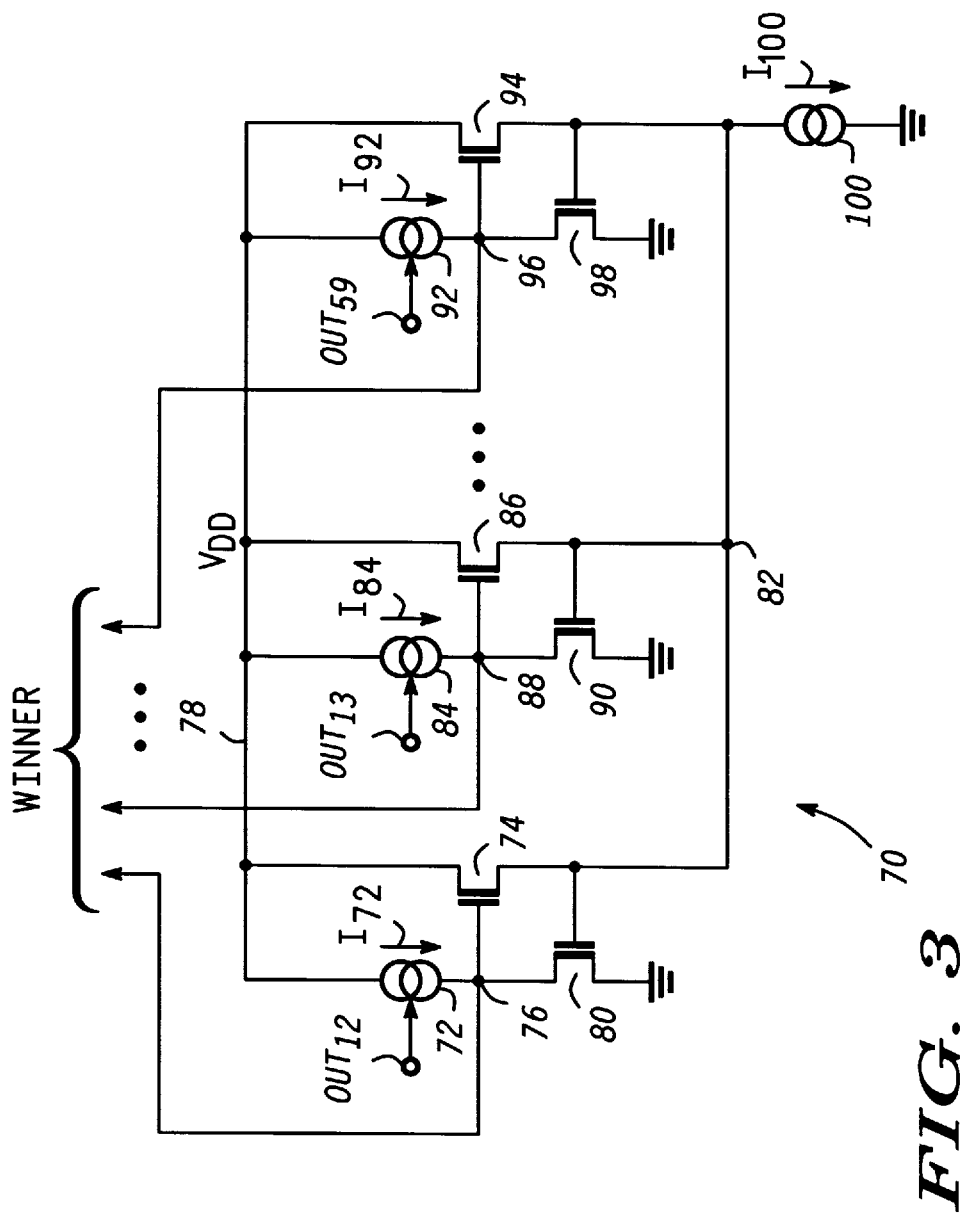
FIG. 3 is a schematic diagram of the decision block of FIG. 1.

Further detail of decision block 70 is shown in FIG. 3 with a plurality of cells controlled by the output signals from the neurons. In one cell, $OUT_{12}$ controls current source 72 to provide a current $I_{72}$ to the gate of transistor 74 at node 76. Transistor 74 has a drain coupled to power supply conductor 78 operating at a positive power supply potential $V_{DD}$ such as 5.0 volts. Transistor 80 has a drain coupled to node 76, a gate coupled to the source of transistor 74 at node 82, and a source coupled to ground potential. In another cell, $OUT_{13}$ controls current source 84 to provide a current $I_{84}$ to the gate of transistor 86 at node 88. Transistor 86 has a drain coupled to power supply conductor 78. Transistor 90 has a drain coupled to node 88, a gate coupled to the source of transistor 86 at node 82, and a source coupled to ground potential. In the last cell, $OUT_{59}$ controls current source 92 to provide a current $I_{92}$ to the gate of transistor 94 at node 96. Transistor 94 has a drain coupled to power supply conductor 78. Transistor 98 has a drain coupled to node 96, a gate coupled to the source of transistor 94 at node 82, and a source coupled to ground potential. Output signals $OUT_{14}$–$OUT_{15}$, $OUT_{32}$–$OUT_{35}$, $OUT_{44}$–$OUT_{47}$, and $OUT_{56}$–$OUT_{58}$ control similar cells coupled to node 82. A current source 100 sinks a fixed current from node 82. Nodes like 76, 88, and 96 in each cell represent the WINNER outputs of decision block 70.

Decision block 70 is a winner-takes-all circuit that determines which one of the neurons has the greatest magnitude output signal corresponding to the highest degree of correlation, which in turn indicates the closest match to the input signal vector. Assume for the present example that the initial random weights of the neurons is such that neuron 12 had the greatest output signal for the first input signal vector $V_{IN}$ (20, 1, 42, 30) for the apple. In that case, $I_{72}$ is greater than $I_{84}$ and $I_{92}$ and all the other controlled current sources in decision block 70. Current source 72 charges node 76 such that its voltage is greater than the voltages at nodes 88 and 96. With the higher voltage at node 76, transistor 74 turns on more and charges node 82 so that transistor 80 conducts the current $I_{72}$. Transistors 90 and 98 share the same common gate node 82 and source node as transistor 80 and, therefore, attempt to conduct a current equal to $I_{72}$. However, current sources $I_{84}$ and $I_{92}$ and all other controlled current sources in decision block 70 are less than current $I_{72}$ because $OUT_{13}$ through $OUT_{59}<OUT_{12}$. Therefore, the voltages at node 88 and node 96 fall as transistors 90 and 98 go into saturation. Node 76, corresponding to the output of neuron 12, has a high voltage level while nodes 88 and 96 and all other similar output nodes in decision block 70 have a low voltage level. The neuron with synapses most closely matched to the elements of the input signal vector $V_{IN}$ overpowers the remaining neurons in decision block 70 and wins the competition. It is not necessary that the synapses of the winning neuron exactly match the input signal vector, only that its synapses be closer than any other neuron's synapses. Decision block 70 thus determines which one of the neurons is the winner as having the greatest output signal which indicates the closest match to the input signal vector.

Once a neuron is recognized as the winner, its synapses are enabled to be adapted, i.e. changed according to a predetermined learning rule, to more closely identify with the input signal vector for the present data item. A typical learning rule for the new synapse value $S_i=S_i+\rho\ (V_n-S_i)$, where "i" is the index of the present synapse, "n" is the index of the present input signal, and "ρ" is plasticity that starts at 0.25 and gradually decreases to approach 0.0 in subsequent training. Synapse 16 in neuron 12 is adapted according to $S_{16}=S_{16}+\rho\ (V_1-S_{16})$. In a similar manner, synapse 20 in neuron 12 is adapted according to $S_{20}=S_{20}+\rho\ (V_2-S_{20})$. Synapse 24 in neuron 12 is adapted according to $S_{24}=S_{24}+\rho\ (V_3-S_{24})$, and synapse 28 in neuron 12 is adapted according to $S_{28}=S_{28}+\rho\ (V_4-S_{28})$. Various hardware implementations of changing the synapses and plasticity are described in U.S. Pat. Nos. 5,067,095, 5,097,141, and 5,216,751.

Neurons in the same neighborhood as the winning neurons are also adapted according to the same learning rule or, alternately, a similar learning rule with a smaller plasticity. The neighborhood is defined as those neurons within certain distance of the winning neuron, e.g. a circle of Euclidean distance two from the winning neuron as seen from a top view of neural network 10. For example, the neighborhood of distance two includes neurons 13, 14, 32, 33, 44, and 45, and possibly neurons 34 and 46 depending on how the neighborhood is defined. The neurons in the defined neighborhood, which is centered on the winning neuron, are enabled to have their synapses adapted as described above.

In the above example, the first input signal vector $V_{IN}$ (20, 1, 42, 30) that provided nutritional information on the apple from the food database is processed through neural network 10 which identifies a winning neuron, i.e. neuron 12, as having the closest match to the input signal vector. The winning neuron synapses and its neighbor's synapses are adapted to more closely match the input signal vector. The winning neuron's match to the present item, i.e. neuron 12 matches with the apple, is stored in a neuron-to-food item cross reference table in the computer memory. In practice, building the cross reference table is typically more effective towards the end of the training process. As training continues, the synapses of neuron 12 become closer to the attributes of the apple, and are thus trained to represent an apple. Neurons in the neighborhood of neuron 12 are trained to identify with food items that are similar in nutritional attributes to the apple.

Next, a second input signal vector $V_{IN}$ from the food database representing nutritional data on an orange is retrieved and applied to neural network 10. For the purpose of the present explanation, assume input signal $V_1$ is a 15.0 mv signal representing 15th percentile of calories for all food items in the database, i.e. 15% of food items have fewer calories and 85% of the food items have more calories. Input signal $V_2$ is a 4.0 mv signal representing 4th percentile of protein for all food items in the database. Input signal $V_3$ is a 30.0 mv signal representing 30th percentile of carbohydrates, and input signal $V_4$ is a 30.0 mv signal representing 30th percentile of fiber for all food items in the database. Neural network 10 processes the second input signal vector $V_{IN}$ (15, 4, 30, 30) and identifies a winning neuron having the closest match to the input signal vector as described above. If neuron 32 is identified as the winning neuron by decision block 70, its synapses are adapted to the input signal vector $V_{IN}$ according to the same learning rule. The neighborhood of neuron 32 includes neurons 12, 13, 14, 33, 34, 44, 45, 46, 56, and 57 which are also adapted to the second input signal vector $V_{IN}$ according to the learning rule to more closely match the input signal vector. The winning neuron that most closely matches the present item, i.e. neuron 32 matches the orange, is stored in the cross reference table in the computer memory. As training continues, the synapses of neuron 32 become closer to the attributes of the orange, and are thus trained to represent an orange. Neurons in the neighborhood of neuron 32 are trained to identify with food items that are similar in nutritional attributes to the orange.

The other items in the food database, e.g. various fruits, vegetables, breads, meats, fishes, poultry, etc. are systematically retrieved and processed through neural network 10, each time identifying a winning neuron and adapting its weights and the weights of its neighbors according to the training rule to more closely match the input signal vector. Once all items of interest in the food database have been processed through neural network 10, then the entire process repeats beginning with the first item, i.e. the apple, only this time with a smaller plasticity in the learning rule and a smaller neighborhood. Once again all items of interest in the food database are processed through neural network 10 and the synapses of the winning neurons and its neighbors adapt accordingly. The process continues over time with the plasticity getting smaller and the neighborhood getting smaller each cycle until the neurons organize to the information in the food database, see step 102 in FIG. 2. At the conclusion of training, the plasticity is approximately zero and the neighborhood is only the winning neuron. Neural network 10 is organized such that food items with similar nutritional attribute data are organized adjacent to one another in the same neighborhood of neurons. Food items that are different are assigned to neurons located some distance away.

In an alternate embodiment, instead of maintaining the cross reference table that relates neurons to food items during or near the end of the training phase, neural network 10 is first allowed to organize naturally by systematically applying input signal vectors representing food items and allowing the synapses to adapt accordingly in the training process described above. No attempt is made to cross reference neurons to a particular food item during the training phase. Once the neural network is organized and fully trained, then each food item is retrieved from the food database in random order and applied to the network. One neuron will match with the data item as described in step 104 of FIG. 2. The winning neuron that matches with the food item, e.g. neuron 12 for the apple and neuron 32 for the orange, is stored in the cross reference table.

In yet another embodiment, the synapses from each neuron of a fully trained neural network are read and compared to the nutritional attribute data in the food database. If neuron 12 ends up with synapses 16, 20, 24, and 28 having of values 18, 2, 42, 31, respectively, then those values are compared to each food item in the database to find a match, see step 104 in FIG. 2. The Manhattan distance formula can be used to find the closest match, i.e. the sum of the absolute values of the difference between corresponding terms. For example, the Manhattan distance between neuron 12 and an apple in the database is given as $|20-18|+|1-2|+|42-42|+|30-31|=4$. If the value four is the minimum of all such comparisons with other food items in the database, then the synapses of neuron 12 (18, 2, 42, 31) most closely match the nutritional data for the apple (20, 1, 42, 30). Neuron 12 is thus established as a candidate for the apple.

All other neurons are checked to see if any already represent the apple. If a previous match exists and the present candidate is a closer match, then it replaces the previous neuron as identifying the apple. If the previous neuron identifying the apple is a closer match, then the candidate is discarded. If no other neurons are found that identify the apple, the present candidate is assigned to represent the apple. A threshold can be established such that the difference between the neuron and the data item must be less than a predefined value in order to accept a match. The process repeats for each neuron in network 10 and the cross reference table is built accordingly. The complete cross reference table stored in computer memory is shown in table 1.

TABLE 1

| Neuron | Food item | Attributes |
|--------|-----------|------------|
| 12 | Apple | 20, 1, 42, 30 |
| 13 | Banana | 26, 4, 54, 20 |
| 14 | Ice cream | 34, 7, 32, 0 |
| 15 | Butter | 26, 1, 1, 0 |
| 32 | Orange | 15, 4, 30, 30 |
| 33 | Pear | 25, 4, 50, 50 |
| 34 | Milk | 38, 29, 20, 0 |
| 35 | Bacon | 9, 7, 1, 0 |
| 44 | Beef | 44, 86, 0, 1 |
| 45 | Shrimp | 21, 68, 0, 0 |
| 46 | Lobster | 20, 61, 2, 0 |
| 47 | Cheese | 29, 25, 1, 0 |
| 56 | Veal | 46, 89, 0, 0 |
| 57 | Pork | 33, 89, 0, 0 |
| 58 | Clams | 21, 79, 8, 1 |
| 59 | Trout | 41, 100, 0, 0 |

Figure 2:
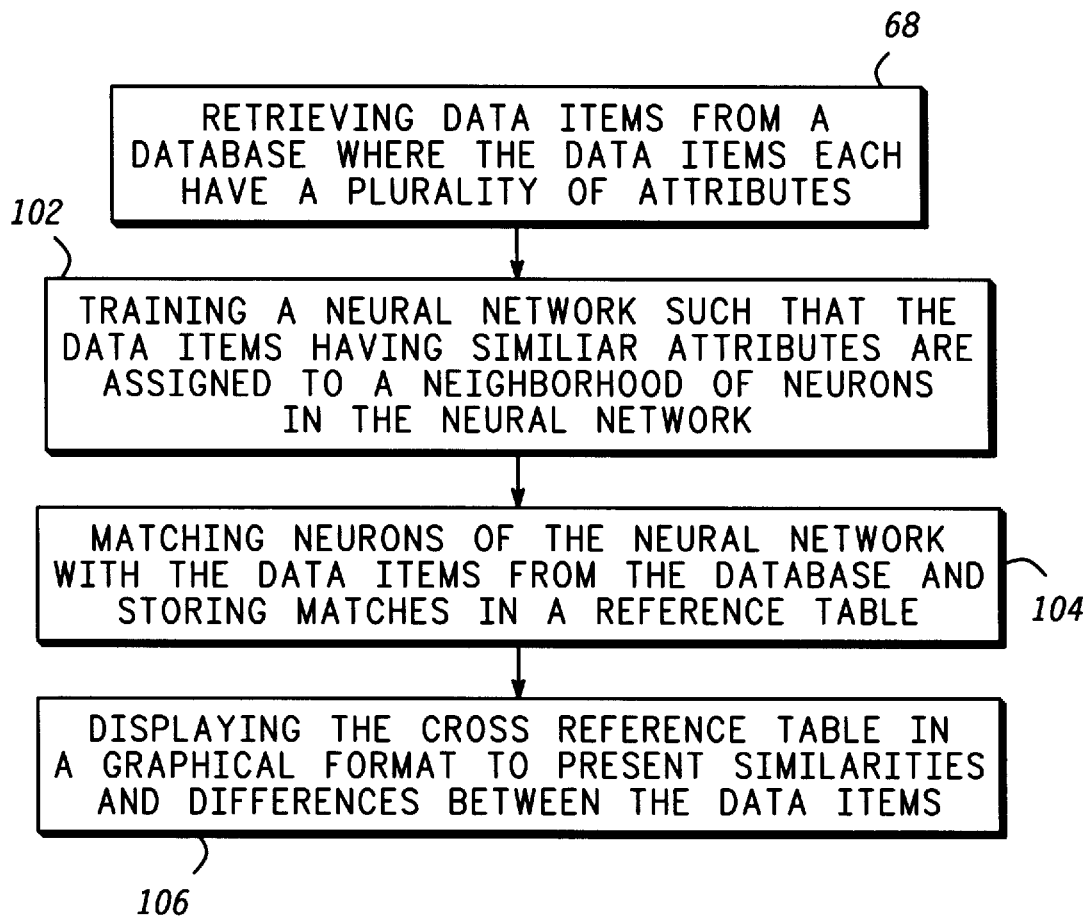
FIG. 2 is a flowchart illustrating the method of organizing data into a graphically oriented format.

In step 106 of FIG. 2, the cross reference table is displayed on computer screen 108 as graphical color icons of the various food items. The graphical icons show a red apple, a yellow banana, etc. to illustrate the food items in the cross reference table as a natural physical embodiment of the food item for quick and easy recognition. The user visually relates the food items and understands the similarities and differences in their attribute data by the proximity of the data items to one another. Items with similar attributes are located in the same neighborhood, i.e. close to one another, while items with dissimilar attributes are located some distance away depending on the degree is dissimilarity.

Figure 4:
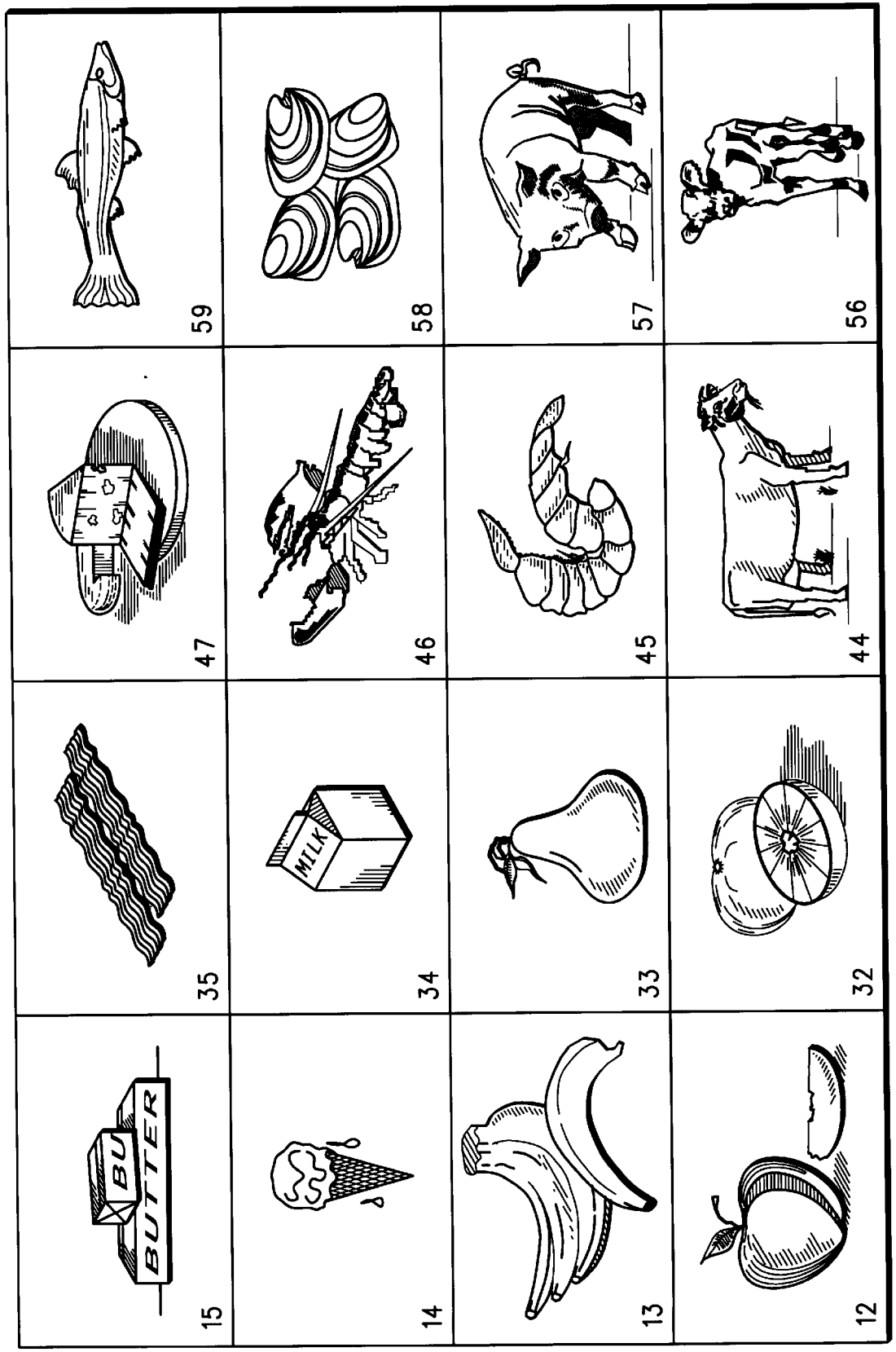
FIG. 4 is a graphical representation of the data from the database.

As part of the present invention, the cross reference table in software that relates neurons to food items becomes a well defined topological organization of the food database with items having similar attribute data grouped together, i.e. in the same neighborhood of neurons, and items with different attribute data located some distance away, as seen in computer screen 108 of FIG. 4. The food items with similar attributes are grouped together because of the neighbors of the winning neurons are adapted to the same learning rule during the training process. For example, neurons 12, 13, 32, and 33 organize to fruits having similar nutritional values, e.g. neuron 12 identifies an apple, neuron 13 identifies a banana, neuron 32 identifies an orange, and neuron 33 identifies a pear. Neurons 14, 15, 34, and 35 generally organize to various dairy products having similar nutritional values, e.g. neuron 14 identifies ice cream, neuron 15 identifies butter, and neuron 34 identifies milk. Note that although neuron 35 identifies bacon, which is a meat, its nutritional attribute data is closer to dairy products than other meats. Neurons 44, 45, 56, and 57 generally organize to various meats having similar nutritional values, e.g. neuron 44 identifies beef, neuron 45 identifies shrimp, neuron 56 identifies veal, and neuron 57 identifies pork. Neurons 46, 47, 58, and 59 generally organize to seafood having similar nutritional values, e.g. neuron 46 identifies lobster, neuron 58 identifies clams, and neuron 59 identifies trout. Note that although neuron 47 identifies cheese, which is a dairy product, its nutritional attribute data is closer to seafood than other dairy products. Although the present example uses only a 4×4 neuron array as an illustration, in practice, neural networks of say 20×20 neurons are useful for a typical computer display screen.

The training rule tends to make related groups of food products with similar nutritional values organize together. Thus, foods with a low calorie content, high carbohydrate content, and high fiber stay together and migrate to the front left corner of neural network 10 of FIG. 1. However, general categories of food, e.g. seafood, meats, and dairy products, do not necessary stay together as seen with bacon in the dairy product area and shrimp grouped with other meats. In the present example, the nutritional attribute data on shrimp, i.e. calories, protein, carbohydrates, and fiber, is closer to that of beef and pork than it is to the nutritional data on other seafood. Likewise, the nutritional attribute data on bacon is closer to that of dairy products than it is to the nutritional data of other meats. The organization allows the user to discover otherwise hidden relationships among the food items, especially in large databases where the relationships are not so obvious.

The relative spacing and placement of similar and dissimilar data items by the process described above to provide a visual graphical overview of the database is a central feature of the present invention. The graphical interface provides the users with a quick overall graphical comparison of the items in the database. For example, in a glance at computer screen 108, the user understands that the nutritional attribute data of an apple is very similar to the orange, but quite different than that of trout.

In computer systems that cannot show readily known icons, such as the company trademark for investment stocks, another option is to display abstract icons with varying sizes, shapes, and colors. For example, a larger red square represents technology company A, a smaller dark red square represents technology company B, and a light red octagon for food service company C. The size of the abstract icon indicates price-earning ratio for the company's stock, and the color saturation shows the debt ratio, and the number of sides to the figure shows the type of business, e.g. technology or food service. The abstract figures provide useful and meaningful graphical relationships.

The present invention is expandable to graphically display attribute planes 18, 22, 26, and 30 as various colors or gray levels on the computer screen to provide a broad spectrum of how a particular attribute varies among the food items. One attribute plane is the synapse values of each neuron across conductive plane 18, which would display how calories are distributed among the various food items. Similar data is readily available for the other attribute planes, e.g. protein, carbohydrate, and fiber distributions across the food items. Further, by clicking with a mouse on particular food item icon, or cell of an attribute plane, the synapse values of the corresponding neuron are displayed that directly relate to the nutritional data in the food database. Alternately, clicking on a particular food item provides the Euclidean or Manhattan distance to other neurons and thereby provides an indication of how similar, or how different, food items are to one another in N-dimensional space, where N is the number of elements in the input signal vector. The software controlling the display of the cross reference table further allows the user to interactively zoom in or zoom out on sections of the table, which is especially useful for large tables.

For larger databases, the items can be partitioned into categories by grouping all neurons within a given Manhattan distance into a category. For example, items such as apples, oranges, and pears, which are within twenty units of each other, are defined a category. The threshold distance determines how many categories exist in the data. A single item from the category is chosen as its exemplar, e.g. apple, and displayed in another cross reference table of only category exemplars. The "apple" category is recognized and interpreted as representative of fruit by the user based on the other items in its category. That is, an apple is a well recognized fruit. The categorized display allows a very large database to be displayed hierarchically, e.g. a thousand item food database are displayed as fruit, meat, vegetables, etc. The distance based algorithm categorizes items automatically based on the attribute relationships. When a high-level category is selected, it zooms in and displays only the lower level food items in that category. For example, selecting the high-level category of fruits, which has an apple as its exemplar, zooms in and displays other fruits such as oranges, bananas, and pears.

The cross reference tables can be animated where several tables are stored over time. In aforementioned example where the database contains investment stock information, a number of cross reference tables are built over time as the data changes. For example, the database is organized to build a first cross reference table for January data, a second cross reference table for February data, and so on. The multiple cross reference tables need to be consistently oriented. Once organized, each cross reference table is visually inspected and, if necessary, re-orienting by flipping it vertically or horizontally. Alternatively, the resulting tables are automatically measured for similarity to determine consistent orientation. The animation of chronologically viewing the cross reference tables provides useful visual information of how the investment stock changes over time.

The computer program controlling the display of the cross reference table is interactive with the user to allow selection of important criteria. In the initial run, the user allows the system to default, i.e. everything equally important of value one ($W_1=W_2=W_3=W_4=1.0$). Once the user sees the results of the default run, the neural network can be re-trained with one of the elements of the input signal vector given a greater salience or importance. For example, the user decides that calories are more important than any other nutritional data. The element $V_1$ is multiplied by input weight $W_1$, while elements $V_2$, $V_3$, and $V_4$ are multiplied by weights $W_2$, $W_3$, and $W_4$, respectively, where $W_1>W_2$, $W_3$, and $W_4$. A cross reference table is built accordingly. Neural network 10 becomes organized primarily by calories. Alternately, the user may decide that calories and proteins together are more important than any other nutritional data. In this case the element $V_1$ is multiplied by input weight $W_1$, while elements $V_2$, $V_3$, and $V_4$ are multiplied by weights $W_2$, $W_3$, and $W_4$, respectively, where $W_1$, $W_3>W_2$, $W_4$. Another cross reference table is built. Each cross reference table based on the desired selection criteria is stored for later recall. The variety of cross reference tables are stored on medium such as compact disk and provide quick organization and display without any on-line training, and with minimal on-line computation.

In yet another example, the user of a personal computer operating a word processor often needs to find and insert an infrequently used character from an infrequently used font. The user types a character, e.g. "o", that looks similar to the one he wants, e.g. "σ". A preorganizes cross reference table appears in a window on the computer screen with the "o" at its center and visually similar characters topological mapped around the "o". The "σ" is easily found, selected, and inserted into the word-processing document. In a similar manner, commercially available clip-art figures are located and easily inserted into documents.

Figure 5:
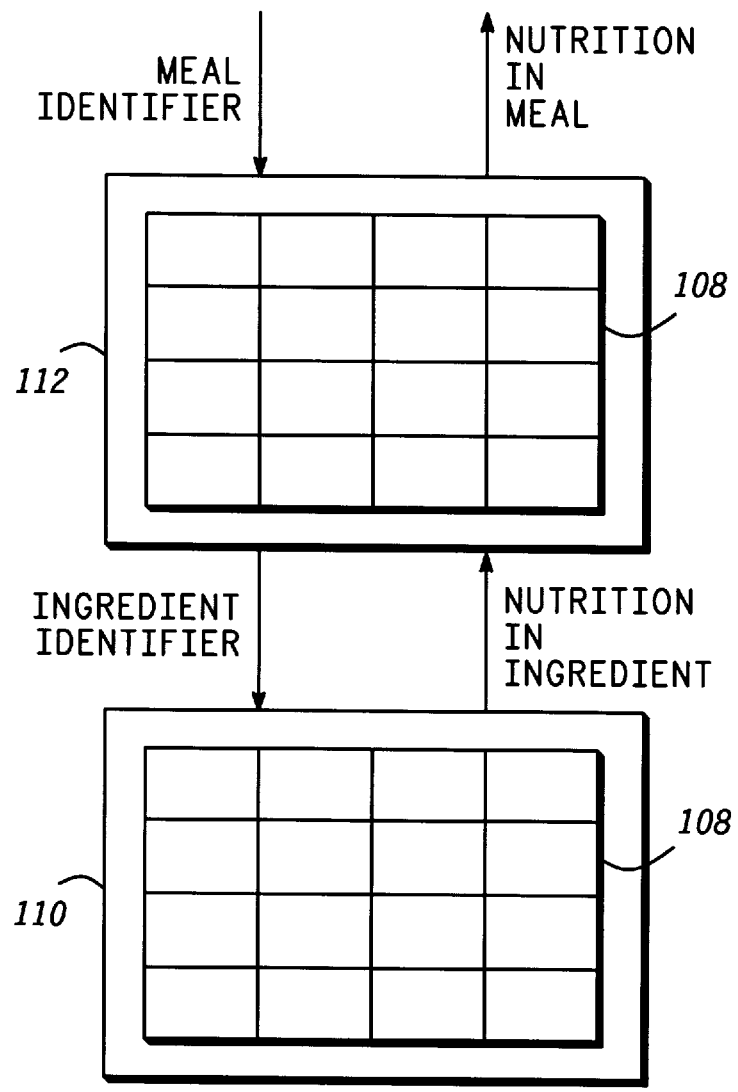
FIG. 5 illustrates hierarchical modules that each provide a graphical representation of data from a database.

By now it should be clear that otherwise large and confusing databases can be organized and graphically displayed to allow easy browsing, indexing, and exploring with the neural network and related software described thus far. One such system, as described in FIGS. 1–4 and related text, is defined as a module. The present invention is expandable to multiple modules as shown in FIG. 5. The database for module 110 comprises food items, e.g. apples, bananas, beef, lobsters, etc., with nutrition attributes such as calories, protein, carbohydrates, fiber, etc. for each food item. When organized, module 110 displays the food items on computer screen 108 according to a cross reference table with similar nutritional attribute data organized near one another.

Module 112 operates with higher level information such as complete meals including beef stew, lasagna, manicotti, chimichanga, Caesar salad, etc. The attributes of the complete meals are the basic food ingredients such as apples, beef, cheese, carrots, pasta, lettuce, etc. The neural network in module 112 trains so that complete meals having similar ingredients organize together. However, module 112 contains no explicit nutrition information for the individual food items. Modules 110 and 112 are independently organized, browsed, indexed and explored, as already described.

Although it is possible to combine the databases of modules 110 and 112 into a single database, keeping the information in separate databases greatly enhances the storage efficiency. The nutrition information for beef is stored only once, even though many different meals include beef. Duplicating the same information is wasteful and inefficient.

Assume the user browses module 112 looking at colorful pictorial icons of familiar and desirable meals and identifies manicotti. The user continues browsing in the vicinity of manicotti looking for similar meals, possibly because not all ingredients are on hand. Next to manicotti the user spots lasagna, which is even more appetizing, but the users wants to know the total nutritional value of the lasagna meal. The user selects the lasagna meal by clicking on its icon. The lasagna selection is the MEAL IDENTIFIER input to module 112. One of the neurons in the neural network of module 112 identifies with lasagna in that its synapses correspond to the food ingredients of lasagna, e.g. cheese, pasta, tomato sauce, beef, etc. Module 112 sends the first food ingredient of lasagna, i.e. cheese, to module 110 as the INGREDIENT SPECIFIER. Module 110 has one neuron that identifies with cheese in that the values of its synapses correspond to the nutritional attribute data for cheese. The neural network in module 110 returns the nutrition information on cheese to module 112 via the NUTRITION IN INGREDIENT channel. Module 112 saves the data. Next, module 112 sends the second ingredient in lasagna, e.g. pasta, to module 110 which in turn fetches the corresponding nutrition information and returns it to module 112. The process continues until an aggregation of the ingredient nutritional information for the lasagna meal is complete assembled. The aggregation of the ingredient nutritional information, in combination with the meal information, is made available to the user over the NUTRITION IN MEAL channel.

The MEAL SPECIFIER channel in FIG. 5 can also be a class of meals. Likewise, the INGREDIENT SPECIFIER in module 110 can be a class of ingredients to optionally allow approximate information to flow between modules. One reason for using such classes is to conserve attribute storage and computation resources. For example, instead of specifying precisely lasagna, the user could specify a lasagna-like class of meals by activating, in addition to the lasagna cell, all cells that meet a chosen similarity criterion, relative to the lasagna weight vector. For example, one criterion might be a Euclidean distance of less than ten distance units from lasagna. Also, since the organized neural networks in the modules are topological organized, various spatial codes are especially effective for defining classes of items or subitems, while still conserving memory and computation resources. For example, one simply uses an x, y coordinate pair, e.g. the x, y position of the winning neuron within the 2-D array, to specify the center of a class.

By now it should be appreciated that the present invention organizes the data items into a graphically oriented format by retrieving data items from a database where each data item has a plurality of attributes. The neural network is organized such that data items having similar attributes are assigned to neurons located close together. Data items having dissimilar attributes are organized farther apart. The neurons of the neural network are matched with the data items from the database and stored in a cross reference table. The cross reference table is displayed in a graphical format to present similarities and differences between the data items based on all attributes simultaneously. The graphic format allows easy browsing, finding items by example and visual interpretation of the relationships among data items. Larger volumes of data can be organized hierarchically for easy viewing.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A computer implemented method of organizing data into a graphically oriented format, comprising the steps of:
    retrieving data items from a database where said data items each have a plurality of attributes;
    training synaptic elements of a neural network with said data items so that said data items having similar attributes are assigned to a neighborhood of neurons in said neural network;
    identifying a closest match between said data items from said database and said neurons of said neural network by comparing said plurality of attributes of said data items with trained values of said synaptic elements of said neurons of said neural network;
    storing said closest match in a first cross reference table; and
    displaying said first cross reference table in a graphical format to present similarities between said data items by positioning similar data items in proximity to one another in a display area.

2. The method of claim 1 wherein said step of training includes the steps of:
    applying elements of an input signal vector representing said plurality of attributes of one of said data items to said neurons of said neural network;
    identifying one of said neurons as having synapses that are most closely matched to said elements of said input signal vector; and
    adjusting said synapses of said one of said neurons to more closely match said elements of said input signal vector according to a predetermined learning rule.

3. The method of claim 2 wherein said step of matching includes the steps of:
    comparing said synapses of one of said neurons to said plurality of attributes of said data items; and
    identifying one of said data items that most closely matches said one of said neurons.

4. The method of claim 2 wherein said step of matching includes the steps of:
    applying said input signal vector representing said plurality of attributes of said one of said data items to said neurons of said neural network; and
    identifying one of said neurons as having synapses that are most closely matched to said elements of said input signal vector.

5. The method of claim 1 wherein said step of displaying includes the steps of:
    forming graphical icons representative of said data items; and
    selecting one of said graphical icons to display attributes of said data items.

6. The method of claim 5 wherein said step of forming graphical icons includes the steps of forming said graphical icons by illustrating natural physical embodiments of said data items.

7. The method of claim 5 wherein said step of forming graphical icons includes the steps of forming said graphical icons by illustrating abstract embodiments of said data items with varying sizes and shapes for each of said data items.

8. The method of claim 1 further including the steps of:
    retrieving data items from a database at a second point in time;
    training said neural network with said plurality of attributes of said data items from said second point in time;

matching said neurons of said neural network with said data items from said database and storing matches in a second cross reference table; and displaying said first and second cross reference tables in chronological sequence in a graphical format to present similarities and differences between said data items over time.

9. A system for organizing data into a graphically oriented format, comprising:

means for training memory elements of an organization map with attributes of data items so that said data items having similar attributes are assigned to a neighborhood of processing elements in said organization map;

means for identifying a closest match between said data items and said processing elements of said organization map by comparing said attributes of said data items with trained values of said memory elements of said processing elements of said projection map;

means for storing said closest match in a first cross reference table; and means for displaying said first cross reference table in a graphical format to present similarities between said data items by positioning similar data items in proximity to one another in a display area.

10. The system of claim 9 wherein said means for training includes:

means for applying elements of an input signal vector representing attributes of one of said data items to said processing elements of said organization map;

means for identifying one of said processing elements as having weights that are most closely matched to said elements of said input signal vector; and means for adjusting said weights of said one of said processing elements to more closely match said elements of said input signal vector.

11. A computer implemented method of organizing data into a graphically oriented format, comprising the steps of:

training processing elements of a projection map with attributes of data items so that said data items having similar attributes are assigned to a neighborhood of said processing elements in said projection map;

identifying a closest match between said data items and said processing elements of said projection map by comparing said attributes of said data items with trained values of said processing elements of said projection map;

storing said closest match in a first cross reference table; and displaying said first cross reference table in a graphical format to present similarities between said data items by positioning similar date items in proximity to one another in a display area.

12. The method of claim 11 wherein said step of organizing includes the steps of:

applying elements of an input signal vector representing attributes of one of said data items to said processing elements of said projection map;

identifying one of said processing elements as having weights that are most closely matched to said elements of said input signal vector; and adjusting said weights of said one of said processing elements to more closely match said elements of said input signal vector.

13. The method of claim 12 wherein said step of matching includes the steps of:

comparing said weights of one of said processing elements to each of said attributes of said data items; and identifying one of said data items that most closely matches said one of said processing elements.

14. The method of claim 12 wherein said step of matching includes the steps of:

applying said input signal vector representing said attributes of said one of said data items to said processing elements of said projection map; and identifying one of said processing elements as having weights that are most closely matched to said elements of said input signal vector.

15. The method of claim 11 wherein said step of displaying includes the steps of:

forming graphical icons representative of said data items; and selecting said graphical icons to display attributes of said data items.

16. The method of claim 15 wherein said step of forming graphical icons includes the steps of forming said graphical icons by illustrating natural physical embodiments of said data items.

17. The method of claim 15 wherein said step of forming graphical icons includes the steps of forming said graphical icons by illustrating abstract embodiments of said data items with varying sizes, shapes or coloring for each of said data items.

18. The method of claim 11 further including the steps of:

providing data items at a second point in time;

organizing said projection map with said attributes of said data items from said second point in time;

matching said processing elements of said projection map with said data items and storing matches in a second cross reference table; and displaying said first and second cross reference tables in chronological sequence in a graphical format to present similarities between said data items over time.

19. The method of claim 11 further including the steps of:

selecting primary items from a first level module;

passing attributes of said primary items to a second level module to select secondary items in said second level module; and passing attributes of said secondary items in said second level module back to said first level module.

20. The method of claim 19 further including the steps of:

aggregating said attributes of said secondary items for one primary item with attributes of said secondary items with a second primary item; and providing said aggregation with said primary items.

21. The method of claim 11 wherein said step of displaying includes the steps of:

forming graphical icons representative of said data items; and displaying said graphical icons to present the similarities between attributes of said data items.

22. The method of claim 21 wherein said graphical icons are arranged in a grid array in the display area.

23. The method of claim 11 wherein said step of displaying includes the steps of:

forming graphical icons representative of said data items; and displaying said graphical icons of similar data items in proximity to each other and said graphical icons of dissimilar data items distant from each other.

24. A method of organizing data into a graphically oriented format, comprising the steps of:

training synaptic elements of a neural network with attributes of data items from a database so that said data items having similar attributes are assigned to a neighborhood of neurons in said neural network;

identifying a closest match between said data items and neurons of said neural network by comparing said attributes of said data items with trained values of said synaptic elements of said neurons of said neural network; and displaying said closest match in a graphical format to present similarities between said data items by positioning similar data items in proximity to one another in a display area.

25. The method of claim 24 wherein said step of displaying includes the steps of:

forming graphical icons representative of said data items; and displaying said graphical icons of similar data items in proximity to each other and said graphical icons of dissimilar data items distant from each other.

26. The method of claim 25 wherein said graphical icons are arranged in a grid array in the display area.

* * * * *